United States Patent
Ellis et al.

(10) Patent No.: US 9,420,056 B2
(45) Date of Patent: Aug. 16, 2016

(54) ANALYTICS CACHING BASED ON USERS CONNECTED

(71) Applicant: International Business Machines Corporation, Armonk, NY (US)

(72) Inventors: Richard R. Ellis, Bristol (GB); Callum P. Jackson, Romsey (GB); Matthew W. Leming, Romsey (GB); Geoffrey S. Pirie, Winchester (GB)

(73) Assignee: International Business Machines Corporation, Armonk, NY (US)

(*) Notice: Subject to any disclaimer, the term of this patent is extended or adjusted under 35 U.S.C. 154(b) by 425 days.

(21) Appl. No.: 13/927,175

(22) Filed: Jun. 26, 2013

(65) Prior Publication Data

US 2015/0006706 A1 Jan. 1, 2015

(51) Int. Cl.
*G06F 15/16* (2006.01)
*H04L 29/08* (2006.01)

(52) U.S. Cl.
CPC ............ *H04L 67/2842* (2013.01); *H04L 67/04* (2013.01); *H04L 67/12* (2013.01); *H04L 67/18* (2013.01)

(58) Field of Classification Search
CPC .................................................. H04L 67/2842
USPC .......................................................... 709/224
See application file for complete search history.

(56) References Cited

U.S. PATENT DOCUMENTS

| | | | | |
|---|---|---|---|---|
| 5,191,410 A | * | 3/1993 | McCalley | H04M 11/085 348/E5.008 |
| 5,305,389 A | | 4/1994 | Palmer | |
| 5,550,982 A | * | 8/1996 | Long | H04L 29/06 719/330 |
| 5,566,170 A | * | 10/1996 | Bakke | H04L 29/06 370/392 |
| 7,003,566 B2 | | 2/2006 | Codella et al. | |
| 7,366,819 B2 | * | 4/2008 | Oberlaender | G06F 12/0886 711/128 |
| 7,788,200 B2 | * | 8/2010 | Crivat | G06N 7/00 706/46 |
| 7,975,025 B1 | * | 7/2011 | Szabo | G06F 17/30902 709/203 |
| 8,065,275 B2 | | 11/2011 | Eriksen et al. | |
| 8,112,475 B2 | * | 2/2012 | Tran | G06F 9/4843 455/418 |
| 8,127,039 B2 | * | 2/2012 | Patton | H04B 10/1149 709/232 |

(Continued)

FOREIGN PATENT DOCUMENTS

EP 2096555 A2 9/2009
KR 1020120055630 A 5/2012

(Continued)

OTHER PUBLICATIONS

IBM. "Method to make a smarter browser URL list cache", IP.com, IP.com Prior Art Database, Technical Disclosure, IP.com No. IPCOM000020032D, Original Publication Date: Oct. 20, 2003, IP.com Electronic Publication: Oct. 20, 2003.

(Continued)

*Primary Examiner* — Melvin H Pollack
(74) *Attorney, Agent, or Firm* — David B. Woycechowsky (57) ABSTRACT

Data is cached at a mobile communication site, such as a cell phone mast or tower computer. The caching is based on collection of "live data," such as the number of communication devices (for example, cell phones) connected in data communication directly to the site, information known about users of the various communication devices connected directly to the site, etc. By caching data that is likely to be useful to the users before it is actually requested, the information can be supplied from the site to the directly connected users more quickly when it is later requested.

18 Claims, 3 Drawing Sheets

(56) References Cited

U.S. PATENT DOCUMENTS

| | | | | |
|---|---|---|---|---|
| 8,214,139 | B2* | 7/2012 | Yonker | G01C 21/20 701/468 |
| 8,219,134 | B2* | 7/2012 | Maharajh | G06F 17/30035 455/3.01 |
| 8,316,098 | B2* | 11/2012 | Luna | G06F 9/5016 709/201 |
| 8,457,653 | B2* | 6/2013 | Ledlie | G01S 5/0236 455/404.2 |
| 8,463,869 | B2* | 6/2013 | Morse | G06F 17/30867 709/203 |
| 8,504,775 | B2* | 8/2013 | Plamondon | G06F 17/30902 711/133 |
| 8,521,172 | B2* | 8/2013 | Rosenau | H04W 28/16 455/424 |
| 8,589,385 | B2* | 11/2013 | Taylor | H04L 67/02 707/722 |
| 8,725,108 | B2* | 5/2014 | Mishkin | H04L 12/14 379/126 |
| 8,769,099 | B2* | 7/2014 | Kalaboukis | G06Q 30/02 709/203 |
| 8,798,017 | B2* | 8/2014 | Liu | H04W 36/0022 370/338 |
| 8,874,848 | B2* | 10/2014 | Soundararajan | G06F 12/0813 711/122 |
| 8,886,176 | B2* | 11/2014 | Luna | H04W 12/06 455/422.1 |
| 8,918,871 | B1* | 12/2014 | Yoon | H04L 63/10 709/223 |
| 8,938,548 | B2* | 1/2015 | Lewis | H04N 7/17318 709/203 |
| 8,971,300 | B2* | 3/2015 | Lee | 370/338 |
| 9,021,021 | B2* | 4/2015 | Backholm | H04L 29/08099 709/203 |
| 9,071,451 | B2* | 6/2015 | Hall | H04L 12/1845 |
| 9,088,611 | B2* | 7/2015 | Jagadeeswaran | H04L 69/16 |
| 9,100,938 | B2* | 8/2015 | Ur | H04W 76/02 |
| 2010/0162126 | A1 | 6/2010 | Donaldson et al. | |
| 2011/0110317 | A1 | 5/2011 | Cleary et al. | |
| 2012/0057456 | A1* | 3/2012 | Bogatin | H04W 28/08 370/230.1 |
| 2012/0149352 | A1* | 6/2012 | Backholm | H04W 52/0258 455/418 |
| 2013/0080576 | A1* | 3/2013 | Taylor | G06F 17/30902 709/217 |
| 2013/0144983 | A1* | 6/2013 | Vantalon | H04L 67/26 709/219 |
| 2013/0246944 | A1* | 9/2013 | Pandiyan | G06F 9/54 715/760 |
| 2013/0308470 | A1* | 11/2013 | Bevan | H04W 64/00 370/252 |
| 2014/0019542 | A1* | 1/2014 | Rao | H04L 67/306 709/204 |
| 2014/0156777 | A1* | 6/2014 | Subbiah | H04L 67/1097 709/213 |
| 2014/0289781 | A1* | 9/2014 | Frydman | H04N 21/23805 725/62 |
| 2014/0344401 | A1* | 11/2014 | Varney | H04L 67/1097 709/217 |
| 2014/0344453 | A1* | 11/2014 | Varney | H04L 67/10 709/224 |
| 2015/0215816 | A1* | 7/2015 | Abou-Elkheir | H04N 21/25866 370/230 |

FOREIGN PATENT DOCUMENTS

| | | |
|---|---|---|
| WO | 2008086155 A2 | 7/2008 |
| WO | 2012103515 A1 | 8/2012 |
| WO | 2012145845 A1 | 11/2012 |

OTHER PUBLICATIONS

Komninos, Andreas, "Personal Predictive Internet Content Pre-caching for Mobile Devices", A thesis presented for the fulfilment of the requirements for a degree of Doctor of Philosphy, University of Strathclyde, 2005, pp. 1-201.

Zhang et al. "Smart Caching for Web Browsers", WWW 2010—Full Paper, Apr. 26-30, 2010, Raleigh, NC, USA, pp. 491-500.

"User behaviour modeling and content based speculative web page prefetching", Internet Archive Wayback Machine, May 22, 2012, <http://www.georgakis.info/publications/pdfs/jour.paper/j003-05-dke-user_behaviour_modeling_and_content_based_speculative_web_page_prefetching.pdf>.

* cited by examiner

Fig. 6

ANALYTICS CACHING BASED ON USERS CONNECTED

FIELD OF THE INVENTION

The present invention relates generally to the field of caching data, and more particularly to the caching of data for use by mobile devices (for example, cell phones).

BACKGROUND OF THE INVENTION

Conventional caches operate by caching the results of previous calls so that future calls do not necessarily require as much processing, at least to the extent that such processing was performed in connection with one of the cached earlier calls. In some situations, the cache-controlling software may cause expiration of cache entries based on a policy relating to one or more characteristics (for example, data size, data age, data usage). Some conventional caches are also enhanced with pre-loading of entries before the initial request has entered the system. This pre-loading is normally completed using at least one of the following: (i) a static list defined by the administrator of the system; and/or (ii) potentially based on the previous content of the cache. Currently conventional pre-loading of the cache using previous content usually reviews the content of the cache before a shutdown and replicates this within the new system.

For purposes of this document, analytics is defined as the discovery, by software, of meaningful patterns in machine readable data. Typically, analytics relies on knowledge from disciplines such as statistics, computer programming and operations research to quantify performance and thereby discover patterns. Analytics sometimes uses "data visualization" to communicate insight. It is known to apply analytics to business data, to describe, predict, and improve business performance. Specifically, arenas within analytics include enterprise decision management, retail analytics, store assortment and SKU optimization, marketing optimization and marketing mix analytics, web analytics, sales force sizing and optimization, price and promotion modeling, predictive science, credit risk analysis, and/or fraud analytics. Typically, analytics is not so much concerned with individual analyses or analysis steps, but with the entire methodology.

SUMMARY

According to an aspect of the present invention, a method includes the following steps (not necessarily in the following order): (i) collecting live data of a mobile communication device connection computer (MCDCC); and (ii) caching data at the MCDCC on condition that a first cache condition is met based, at least in part, upon the live data. The MCDCC is a computer that provides a communication link for wireless mobile devices. The live data is based upon and/or derived from a plurality of wireless mobile devices connected to the MCDCC at the time the live data is collected.

DETAILED DESCRIPTION

This DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
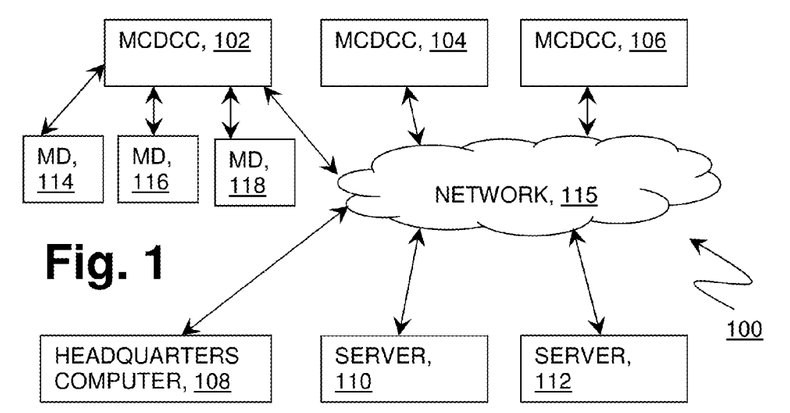
FIG. 1 is a schematic view of a first embodiment of a mobile device communication system according to the present invention.
Figure 2:
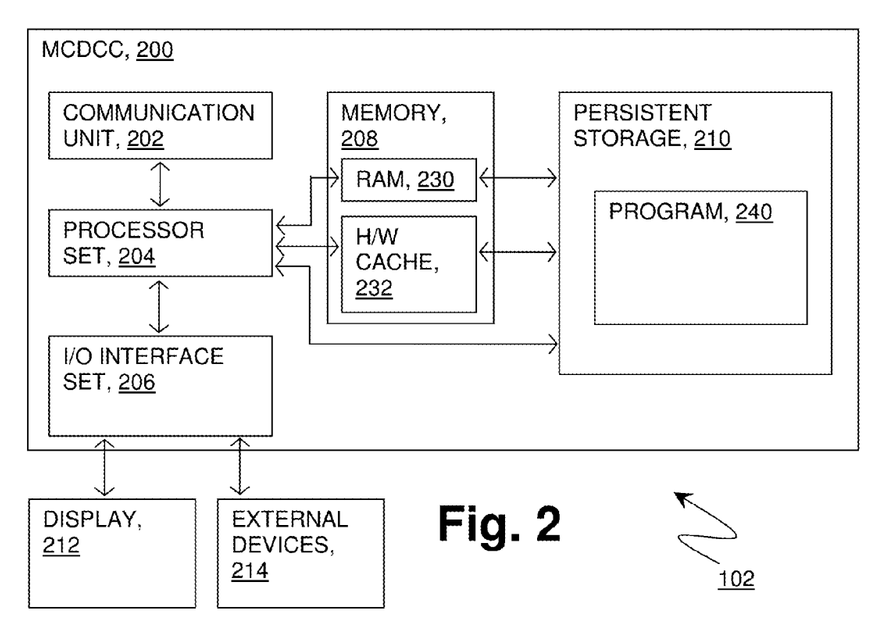
FIG. 2 is a schematic view of a mobile communication device connection computer (MCDCC) sub-system portion of the first embodiment system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: mobile communication device connection computer (MCDCC) sub-systems 102, 104, 106; headquarters computer sub-system 108; server computer sub-systems 110, 112; communication network 115; mobile devices (MDs) 114, 116, 118; MCDCC 200 (see definitions sub-section of this Detailed Description section); communication unit 202; processor set 204; input/output (i/o) unit 206; memory device 208; persistent storage device 210; display device 212; external device set 214; random access memory (RAM) devices 230; hardware cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 115. Program 240 is a collection of machine readable instructions and data that is used to create, manage and control certain software functions that will be discussed in detail, below, in the Operation of the Embodiment(s) sub-section of this DETAILED DESCRIPTION section.

Server computer sub-system 102 is capable of communicating with other computer sub-systems via network 115 (see FIG. 1). Network 115 can be, for example, a local area network (LAN), a wide area network (WAN) such as the Internet, or a combination of the two, and can include wired, wireless, or fiber optic connections. In general, network 115 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as other various sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

Communication unit 202 also acts as a telecommunications and internet hub for MDs 114, 116, 118. The MD sub-systems connect and communicate through communications unit 202 with other telephonic and/or computer devices that are connected to network 115. The data communication connection between the MDs and communications unit 202 of MCDCC 200 is wireless. The connection between communications unit 202 of MCDCC 200 and network 115 is wireless or wired. When one of the MDs moves out of wireless range of MCDCC 200 of sub-system 102, then it may connect to one of the other MCDCC sub-systems 104, 106 if these come into range. Otherwise the connection between an MD and network 115 may be lost if it is out of the range of all of the MCDCCs system-wide.

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
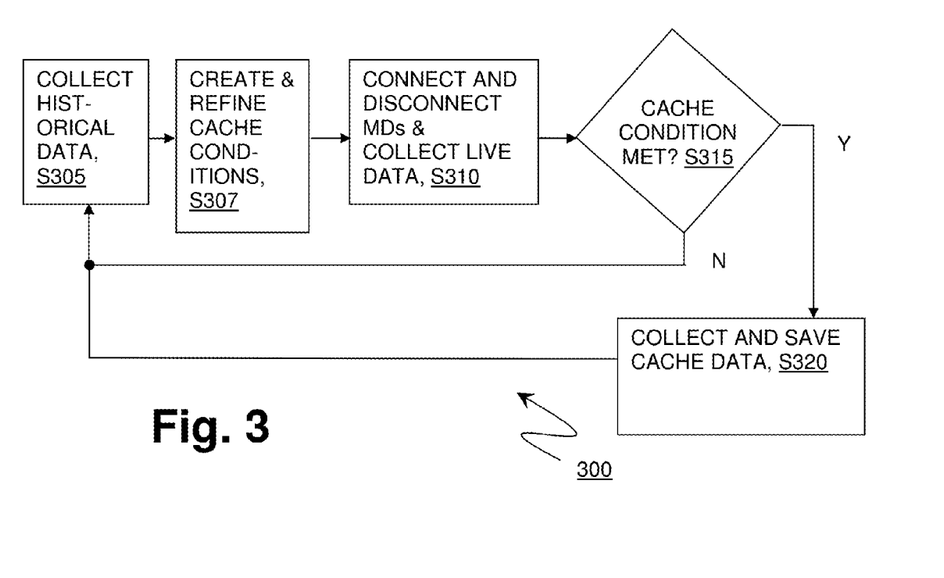
FIG. 3 is a flowchart showing a process performed, at least in part, by the first embodiment computer system.
Figure 4:
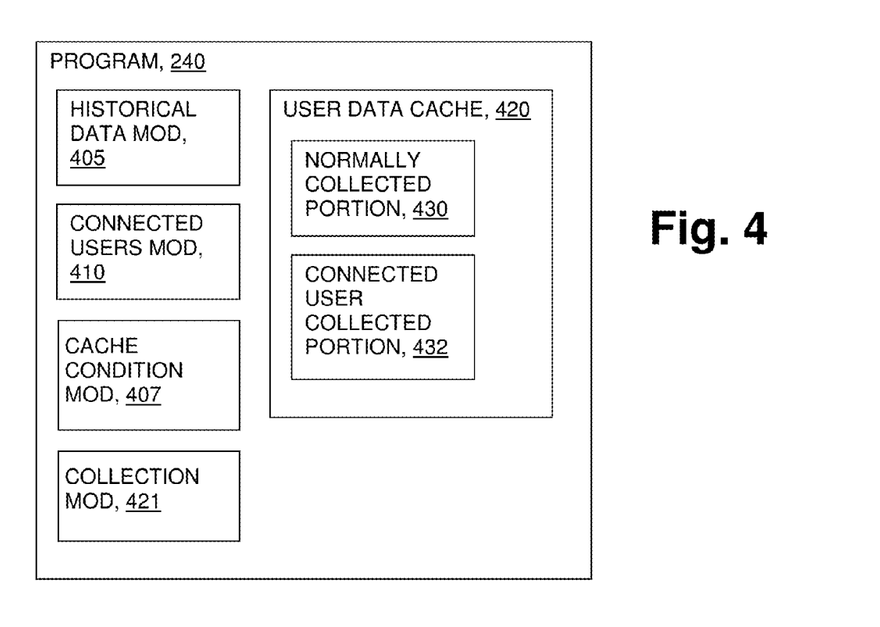
FIG. 4 is a schematic view of a portion of the MCDCC sub-system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

Process 300 is performed by mobile communication device connection computer (MCDCC) sub-system 102 (see FIGS. 1, 2 and 4) which is a "local" connection hub for wireless communication devices (see definition of mobile communication device connection computer, below, in Definitions sub-section of this DETAILED DESCRIPTION section). In order to understand process 300 and program 240, the following things should be understood with respect to the communication network environment 100 of FIG. 1: (i) mobile devices (MDs) 114, 116, 118 represent cell phones "directly connected" to MCDCC sub-system 102; (ii) MDs 114, 116, 118 are indirectly connected to network 115 (and various systems connected to network 115) through MCDCC sub-system 102; and (iii) MCDCC 102 is representative of a geographically dispersed multiplicity of MCDCCs that can connect to the MDs as the MDs are moved around a territory, such as a country, state, nation, or even the world.

Processing starts at step S305 where historical data module (mod) 405 of program 240 of MCDCC 102 collects historical data. In this illustrative (but not necessarily preferred, as will be explained below) embodiment the historical data is very comprehensive, and includes information regarding: (i) the date and time interval that each and every MD has been in data communication (see DEFINITIONS sub-section, below) with MCDCC 102 (this is called "connection" information); (ii) the precise locations of each and every MD during the time interval(s) that the MD has been in data communication with MCDCC 102 (this is called "location information"); (iii) information about the identity of the registered user of each MD that has been in data communication with MCDCC 102, including both identification information given to the cell phone provider in connection with the cell phone account and also identification that can be gleaned from publically accessible records regarding the identity of the registered users (also called "identity information," see DEFINITIONS sub-section below); (iv) the identity and/or substance of any telephone communications, internet chat communications, email communications made or internet web pages accessed by the user through her MD while in data communication with MCDCC 102 (also called "communication information"); (v) the identity and/or substance of any files stored on, or accessible through, an MD while it is in data communication with MCDCC 102 (also called "files information"); and/or (vi) any other information about the various MDs and/or their respective users (herein called "other information" to the extent such information does not fall into one of the other previously-defined categories.

It was mentioned above that the comprehensiveness of the historical information here may cause embodiment 100 to be not-necessarily-preferred. This is because the system design should take into account privacy concerns of the users and therefore should not: (i) collect any information it is not legal to collect; and/or (ii) collect any information it is unethical to collect. That said, the privacy concerns, the legality of collecting information and/or the ethics of collecting information will depend upon the larger context in which system 100 is deployed. For example, if system 100 is a military installation, all of the MDs are military issued devices, issued exclusively for military use by military personnel and MCDCC is controlled by the military, then any privacy concerns might be greatly diminished in this context, and the full panoply of possible types of historical information outlined above might be considered legal and ethical to collect and use. On the other hand, for many embodiments of the present invention, the possible types and/or specific items of historical information will be limited by privacy concerns and/or lack of informed consent.

Perhaps the least intrusive form of historical information is connection data about how many MDs have been connected to a particular MCDCC at some, or all, times in the past. As will be seen below, even this information can be quite useful for caching purposes in some embodiments of the present invention.

At step S305, historical data mod 405 may collect historical data in various ways. For example, information may have been collected in real time, automatically and by software, over the lifetime of the MCDCC. Additionally, or alternatively, actual, or representative, historical information may be added, for example, manually by human data entry, or automatically from legacy database(s).

Processing proceeds to step S307 where cache condition mod 407 creates and refines "cache conditions" based on: (i) historical data; and/or external input (for example, a system designer creates a new cache condition). The use of these cache conditions will be explained below in connection with step S315.

Processing proceeds to step S310 where connected users mod 410 collects "live data" as MDs 114, 116, 118, etc. connect and disconnect from MCDCC 102 (see FIG. 1). The connections may happen for various reasons including the following: (i) an MD is moved into range of MCDCC 102 and connects automatically; (ii) of all MCDCCs in the system, the system determines that it is optimal for the given MD to connect to MCDCC instead of (or in addition to) any of the other MCDCCs in its range; (iii) user turns on MD and connection to proximate MCDCC 102 is established automatically; and/or (iv) user provides user input to purposefully connect to MCDCC 102. Similar to the connections, disconnections may happen in various ways.

The live data collected by connected users mod 410 may be of one or more types discussed above in connection with historical data, specifically: (i) connection information; (ii) location information; (iii) identity information; (iv) communication information; (v) files information; and/or (vi) other information. The same privacy and ethical concerns discussed above in connection with historical data generally also apply to live data. The live data will generally include, at a minimum, connection information including how many MDs are currently connected to MCDCC 102.

Processing proceeds to step S315 where cache condition mod 407 checks for the existence of one or more cache conditions. If a cache condition exists, then cache data will be retrieved from external sources and cached locally in the MCDCC sub-system so that the cache data is quickly and reliably available to the users of the various MDs 114, 116, 118 that are connected in wireless data communication with MCDCC 102. The identity of this external-source data will generally depend upon what the cache condition is. In some embodiments there will also be uncaching condition(s), which determine when certain cached data no longer needs be retained at MCDCC 102. If, at step S315, it is determined that none of the cache condition(s) are met, then no new data needs to be cached in MCDCC 102, and processing loops back to step S305.

If, at step S315, to is determined that one or more of the cache condition(s) are met, then processing proceeds to step S320 where collection mod 421 works co-operatively with communication unit 202 (see FIG. 2), network 115 and various server sub-systems 110, 112 (see FIG. 1) to collect selected data, from locations remote from MCDCC 102, to put into connected user collected portion 432 of user data cache 420. This data serves to supplement the data which may exist in normally collected portion 430 of user data cache 420. As those of skill in the art will appreciate, connected user collected portion 432 is based upon live data from a plurality of MDs (often a large plurality of MDs) that are connected to MCDCC at a given time. The meeting of a cache condition, based upon the live data, allows the system to try to predict specific data that users will want and need. By putting this data in portion 432 (at least on a temporary basis), it may potentially be easier, quicker and more reliable to transfer the data to the MDs when they come to request data that collection mod 421 has predicted that the users will request based upon the nature and substance of the cache condition(s) that are met at a given point in time.

Some illustrative, non-limiting examples of cache condition(s) and associated collected data are as follows: (i) influx of people to a stadium (connection information at cell tower near the stadium) indicates that there will soon be a need for public transportation information (this example is discussed at length in the next sub-section of this DETAILED DESCRIPTION section); (ii) numerous connections by people who have Chinese as a first language (that is, a form of identity information) in the vicinity of a Chinese New Years' festival in the United States indicates the need for online Chinese-to-English and English-to-Chinese dictionaries; (iii) military personnel sending email messages (that is, a form of communication information) about potable water indicates a need for information on potable water sources in the vicinity of the military MCDCC; and/or (iv) users entering the vicinity of a MCDCC have files on their MDs' storage devices (that is, file information) of songs by a certain musical group indicating the need to have all of the musical group's songs available locally at the MCDCC for streaming to the MDs from legal streaming services. It is worth mentioning again that: (i) this caching should only be performed if and when circumstances render the underlying collection of information both ethical and legal; (ii) the connection information will usually be legal and ethical for the MCDCC to have and use for caching; and (iii) other types of live data are more likely to be forbidden to use for caching (again, depending upon the circumstances).

In this embodiment, after step S320 is completed, then processing loops back to step S305 for further possible collection of historical data. It is further noted that when processing arrives, in due course, back at step S310, then connected users may request data, which MCDCC will deliver from cache 420 (either portion 430 or 432) if the data is there. In this embodiment, and probably in most embodiments, the cache will not have all information that any user may request, but, because of the use of cache conditions to help determine data in portion 432 of the cache, the cache may have more and better data than it otherwise would in order to be optimally ready for a great volume of user requests for information.

III. Further Comments and/or Embodiments

The present invention recognizes that, as the usage of the internet expands: (i) the possible content, which users may want or need, has increased significantly in scope and size; and (ii) static caching, as described above in the BACKGROUND section, where caching occurs upon a shutdown, may no longer be optimal. An example of this is mobile phone masts. In this example of a conventional caching system, the content that is cached at each mast is dependant on: (i) the users connected to those masts; and (ii) the applications and requests that they are making. The present invention recognizes that the currently conventional static approach may not be an optimal caching solution in this sort of example.

Some embodiments of the present invention provide an analytics based caching solution where software predicts the most suitable cache content based on analyzing previous trends. For instance, take a series of mobile phone masts located close to an event location (for instance, a tennis stadium). When an event occurs at the location, the phone mast has a large number of users and service requests such that service becomes difficult. After the initial event, an embodiment of the present invention analyzes the trend of activity and realizes that a couple of hours after a user connects to the mobile phone mast that same user will generally request public transport information related to getting that user back to her home. After analyzing further, the software of this embodiment identifies that several groups of people are travelling to the same tennis stadium, and are requesting the similar information regarding public transit and ways to get back home. Analytics-based caching according to this embodiment of the present invention takes the foregoing information for future situations. When the software later identifies a high number of users connecting to the phone mast, then the software pre-loads the public transport data which is expected to be required based on patterns found during previous tennis event(s).

Some embodiments of the present invention further include real-time analytics software that recognizes the pattern that users tend to request public transport information back to the registered location of their respective hand sets. During future tennis events, this embodiment determines that a number of mobile users from a similar registered location are connected, and, if this is above a desired threshold, the software pre-populates the cache of the mast even before the initial request is submitted by a user (see definition, below, in Definitions sub-section of this DETAILED DESCRIPTION section).

Figure 6:
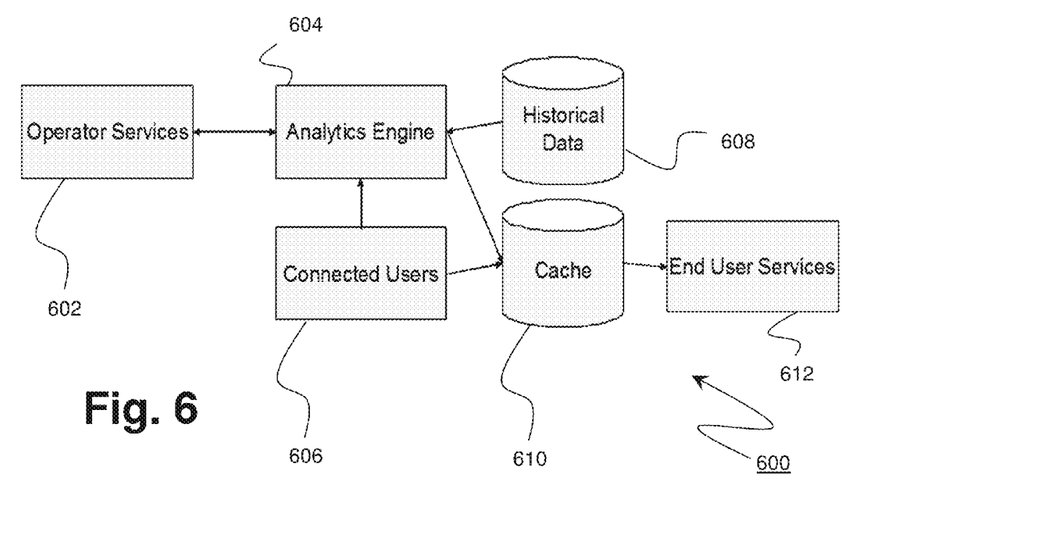
FIG. 6 is a schematic view of a second embodiment of a mobile device communication system according to the present invention.

FIG. 6 shows system 600 including: operator services block 602; analytics engine block 604; connected users block 606; historical data block 608; cache block 610; and end user services block 612. End user services block 612 provides services, such as the public transport information system cache block 610 provides a local copy of the data available at the end user services block. Connected users block 606 represents the end consumers of the end user services block and includes identification information associated with these end consumers. In this embodiment, the identification information is queried against information in operator services block 602 in order to discover additional information regarding a particular end consumer or set of end consumers.

Historical data block 608 represents a database that includes: (i) data regarding what connected users (of block 606) have previously requested; and (ii) any identified patterns for analytics engine block 604. The analytics engine block has two components (not separately shown in FIG. 6) that will now be discussed respectively in the following two paragraphs.

The batch processing component is where the analytics engine block mines the historical data block using the operator services block in order to identify patterns, such as the public transport information requests mentioned above. The batch processing component can then determine trigger events that should cause the cache to be populated with this information.

The real-time processing component is where the analytics engine block uses the batch processing output to populate the cache based on the connected users. It can also be expanded to customize the caching to a greater degree using operator services to resolve additional information regarding the connected users. For instance, working co-operatively together, the batch processing component and real-time processing component cause, when a certain threshold number of users attaches to the mobile phone mast near the tennis stadium, the analytics software to recognize as follows: (i) that a tennis match is probably taking place at the tennis stadium; (ii) that in a few hours, users will want public transport information regarding how to get to their respective homes; and (iii) that the homes of the users will probably correlate to home information respectively associated with their respective smart phones. When the analytics software recognizes these patterns then it causes caching of public transport information, in cache 610, based upon where the users homes are (with this information to be held in cache until after the unusually high concentration of users has left the area of the mast near the tennis stadium).

Here is an example work flow: (i) a user connects their device to the system, and their identity and location is determined; (ii) at this stage the analytics engine decides if any content should be pre-loaded into the cache based on the historical data and operation services; (iii) when the user accesses content, the system logs the activity into the historical DB and decides if the content should be cached depending on other users connected, historical data and operator services; (iv) in addition the analytics engine block continuously identifies patterns based on the users connected, location, user characteristics found via operator services and data retrieved, identifying new patterns; and (v) based on this analysis, cache 610 can be pre-populated as soon as a user connects to the system at step (ii).

Another example work flow is as follows: (i) a user with a mobile phone arrives at a football game and their phone automatically connects to the local phone mast; (ii) the phone mast queries the analytics engine asking if the cache should be pre-populated with any content; (iii) the analytics engine returns travel information (for travelling back to the user's registered home location (see FIG. 5)), which travel information will be populated into a cache at the local phone mast because multiple users from the same home locations are registered and now above a threshold (based on analysis of the connected users, historical data and operator services); (iv) the system updates the cache with the relevant information; (v) users request the public transport information back home when the football game finished and this is returned from the cache at the local phone mast near the football game; (vi) the individual request is logged into the historical data to improve the caching for future situations; and (vii) additional users requesting public transport information to the same location also get the same cached result.

In some embodiments of the present invention, caching of data is caused based, at least in part, on connection information (current location, number of connections) and the device's registered location, as shown by connected users block 606 of FIG. 6. Some embodiments of the present invention include at least one of the following features, advantages and/or characteristics: (i) the historical data contains connection, location and identification information; (ii) both historical and "live" data is used by the analytics engine; (iii) the trigger for pre-population of the cache is at connection time; (iv) the trigger for pre-population of the cache is prior to service request time; and/or (v) caching of data is based, in part, upon historical data, connected users and external services.

Figure 5:
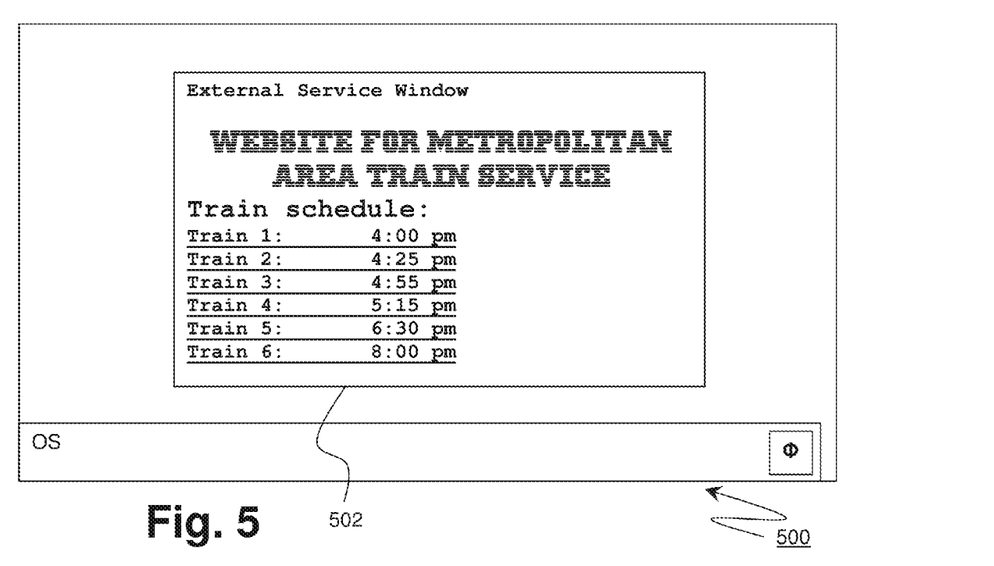
FIG. 5 is a first screenshot generated by the first embodiment computer system.

In the above examples, the historical data considered is the web requests that were previously made by connected phones subsequent to a past surge of users in that location. In the above examples, the connected users data includes: (i) the number of connected users; (ii) the respective locations of the connected users; (iii) the home addresses of the connected users; and/or (iv) device information (for example, system, browser, applications) of the connected users. In the above examples, the external services considered were transportation checking services. For instance it could be a train line checking system, to identify when the next train home would be. This is shown in FIG. 5 at screen shot 500, display window 502. More generally, external services can be as varied in nature and scope as the internet is.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Mobile communication device connection computer (MCDCC): a computer that provides a communication link for wireless mobile devices (for example, mobile phones); connections, by various mobile devices, to an MCDCC are generally not local in the sense of being in the same room or the same building, but are local in the sense of distances associated with a typical cell phone connecting to a network through a "local" cell phone tower; MCDCCs include, but are not limited to: mobile phone "masts" computers; cell tower computers; MCDCCs associated with a single cell phone carrier; private MCDCCs, etc.; the mobile communication devices may be any type of wireless communication device, now known or to be developed in the future, including, but not necessarily limited to cell phones.

Identity information: includes, but is not limited to name, address, telephone number, marital status, hobbies, employment history, criminal records, internet message board postings, political affiliations, etc., etc.

Connected user related data: Any data relating to a user who's MD is currently connected to an MCDCC; connected user data may include, but is not necessarily limited to: (i) the number of users currently connected to the MCDCC; (ii) the respective locations of the connected users; (iii) the home addresses of the connected users; and/or (iv) device information (for example, system, browser, applications) of the connected users.

Historical data: any data related to any past operations and/or users of any MCDCC or set of MCDCC; in some embodiments of the present disclosure, an MCDCC may utilize historical data from other MCDCC, both proximate and remote.

What is claimed is:

1. A method comprising:
    collecting collected data from a plurality of mobile devices related to a respective current status of the plurality of mobile devices;
    mining, by an analytics engine, a historical data store using operator services in order to find a first pattern in the collected data;
    determining, by the analytics engine, based on historical data and the first pattern, predicted data that is likely to be requested in the future by the plurality of mobile devices over a communication path including a wireless communications tower that includes a wireless communications tower computer; and
    caching the predicted data in a cache at the wireless communications tower computer;
    subsequent to caching of the predicted data, receiving a request from a user's device; and
    responsive to the request, delivering, from the cache, through a wireless communications network and to the user's device, the predicted data.

2. The method of claim 1 wherein the wireless communications tower is a mobile phone mast computer.

3. The method of claim 1 wherein the collected data includes data of at least one of the following types: (i) connection information; (ii) location information; (iii) identity information; (iv) communication information; and (v) files information.

4. The method of claim 1 wherein the collected data consists of connection information.

5. The method of claim 1 wherein the first pattern is indicative of a plurality of people attending an event in such proximity to the wireless communications tower that wireless communications initiated by the plurality of people through their mobile devices are likely to have a communication path including the wireless communications tower.

6. The method of claim 1 wherein the historical data includes connection information.

7. A computer program product comprising:
a non-transitory storage device; and
machine readable data stored on the non-transitory storage device;
wherein the machine readable data comprises:
  first program instructions programmed to collect collected data from a plurality of mobile devices related to a respective current status of the plurality of mobile devices,
  second program instructions programmed to mine, by an analytics engine, a historical data store using operator services in order to find a first pattern in the collected data,
  third program instructions programmed to determine, by the analytics engine, based on historical data and the first pattern, predicted data that is likely to be requested in the future by the plurality of mobile devices over a communication path including a wireless communications tower that includes a wireless communications tower computer;
  fourth program instructions programmed to cache the predicted data in a cache at the wireless communications tower computer;
  fifth program instructions programmed to, subsequent to caching of the predicted data, receive a request from a user's device; and
  sixth program instructions programmed to, responsive to the request, deliver, from the cache, through a wireless communications network and to the user's device, the predicted data.

8. The computer program product of claim 7 wherein the wireless communications tower is a mobile phone mast computer.

9. The computer program product of claim 7 wherein the collected data includes data of at least one of the following types: (i) connection information; (ii) location information; (iii) identity information; (iv) communication information; and (v) files information.

10. The computer program product of claim 7 wherein the collected data consists of connection information.

11. The computer program product of claim 7 wherein the first pattern is indicative of a plurality of people attending an event in such proximity to the wireless communications tower that wireless communications initiated by the plurality of people through their mobile devices are likely to have a communication path including the wireless communications tower.

12. The computer program product of claim 7 wherein the historical data includes connection information.

13. A wireless communications tower computer system for controlling operations of a wireless communications tower, the system comprising:
a set of processor(s);
a non-transitory storage device; and
machine readable data stored on the non-transitory storage device;
wherein:
the set of processor(s) is operatively connected to the non-transitory storage device so that the set of processor(s) executes program instructions stored on the non-transitory storage device; and
the machine readable data comprises:
  first program instructions programmed to collect collected data from a plurality of mobile devices related to a respective current status of the plurality of mobile devices,
  second program instructions programmed to mine, by an analytics engine, a historical data store using operator services in order to find a first pattern in the collected data,
  third program instructions programmed to determine, by the analytics engine, based on historical data and the first pattern, predicted data that is likely to be requested in the future by the plurality of mobile devices over a communication path including a wireless communications tower that includes a wireless communications tower computer;
  fourth program instructions programmed to cache the predicted data in a cache at the wireless communications tower computer;
  fifth program instructions programmed to, subsequent to caching of the predicted data, receive a request from a user's device; and
  sixth program instructions programmed to, responsive to the request, deliver, from the cache, through a wireless communications network and to the user's device, the predicted data.

14. The system of claim 13 wherein the wireless communications tower is a mobile phone mast computer.

15. The system of claim 13 wherein the collected data includes data of at least one of the following types: (i) connection information; (ii) location information; (iii) identity information; (iv) communication information; and (v) files information.

16. The system of claim 13 wherein the collected data consists of connection information.

17. The system of claim 13 wherein the first pattern is indicative of a plurality of people attending an event in such proximity to the wireless communications tower that wireless communications initiated by the plurality of people through their mobile devices are likely to have a communication path including the wireless communications tower.

18. The system of claim 13 wherein the historical data includes connection information.

* * * * *